(12) United States Patent
Kondo

(10) Patent No.: US 7,145,574 B2
(45) Date of Patent: Dec. 5, 2006

(54) COLOR REPRODUCTION CHARACTERISTIC DISPLAY APPARATUS, AND COLOR REPRODUCTION CHARACTERISTIC DISPLAY PROGRAM STORAGE MEDIUM

(75) Inventor: Hirokazu Kondo, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/964,337

(22) Filed: Sep. 28, 2001

(65) Prior Publication Data

US 2002/0036786 A1 Mar. 28, 2002

(30) Foreign Application Priority Data

Sep. 28, 2000 (JP) ............... 2000-296670

(51) Int. Cl.
*G09G 5/02* (2006.01)
*G06K 9/00* (2006.01)
*H04N 1/48* (2006.01)
*G06F 15/00* (2006.01)
*H04N 1/56* (2006.01)

(52) U.S. Cl. ............ 345/591; 345/589; 345/604; 382/162; 358/518

(58) Field of Classification Search ........ 345/589–606; 358/1.9, 518, 504, 3.23, 519; 382/162–167
See application file for complete search history.

(56) References Cited

U.S. PATENT DOCUMENTS

| | | | | |
|---|---|---|---|---|
| 5,625,762 A * | 4/1997 | Takizawa et al. | ............ | 345/591 |
| 5,627,950 A * | 5/1997 | Stokes | ............ | 345/591 |
| 5,857,063 A * | 1/1999 | Poe et al. | ............ | 358/1.9 |
| 6,215,561 B1 * | 4/2001 | Kakutani | ............ | 358/1.9 |
| 6,269,184 B1 * | 7/2001 | Spaulding et al. | ............ | 382/167 |
| 6,411,304 B1 * | 6/2002 | Semba et al. | ............ | 345/590 |
| 6,459,436 B1 * | 10/2002 | Kumada et al. | ............ | 345/590 |
| 6,621,498 B1 * | 9/2003 | Handley et al. | ............ | 345/604 |
| 6,766,051 B1 * | 7/2004 | Klassen et al. | ............ | 382/162 |
| 7,009,733 B1 * | 3/2006 | Gruzdev et al. | ............ | 358/1.9 |
| 2002/0067849 A1 * | 6/2002 | Klassen | ............ | 382/162 |
| 2002/0105659 A1 * | 8/2002 | Rozzi | ............ | 358/1.9 |

* cited by examiner

*Primary Examiner*—Wesner Sajous
(74) *Attorney, Agent, or Firm*—Sughrue Mion, PLLC

(57) ABSTRACT

A display apparatus displays on a two-dimensional basis or a three-dimensional basis points within an $L^*a^*b^*$ space associated with lattice points of a CMYK color space.

23 Claims, 10 Drawing Sheets

COLOR REPRODUCTION CHARACTERISTIC DISPLAY APPARATUS, AND COLOR REPRODUCTION CHARACTERISTIC DISPLAY PROGRAM STORAGE MEDIUM

BACKGROUND OF THE INVENTION

1. Field of the Invention

The present invention relates to a color reproduction characteristic display apparatus for displaying color reproduction characteristics defined in accordance with a device for mediating between image data and an image, for example, an input device for converting an image to image data, such as a color scanner and a digital scale camera, and an output device (including a display device for outputting or displaying an image on a display screen, such as a display unit and the like) for outputting an image in accordance with image data, such as a printing machine and a printer, and a color reproduction characteristic display program storage medium storing a color reproduction characteristic display program which causes a computer to operate as the color reproduction characteristic display apparatus.

2. Description of the Related Art

Hitherto, it is performed that an input device, for example, a color scanner or an electronic scale camera, is used to take an image (hereinafter, it is referred to as an original image) in to obtain image data, so that an reproduced image of the original image is obtained in accordance with the image data by a printing machine or a printer, or on a display screen. In this case, there are determined a color reproduction characteristic (profile) associating a color on the original image with a color on the image data, according to the input device, and a color reproduction characteristic (profile) associating a color on the image data with a color on the reproduced image, according to the output device such as a printing machine and a printer, and image data obtained from the original image by the input device is converted into image data suitable for the output device in accordance with both the color reproduction characteristics, so that the reproduced image is outputted in accordance with the image data for the output device. This feature makes it possible to obtain the reproduced image coincident with the original image in color.

The same matter as the above will occur between output devices. Next, there will be explained an example.

Hitherto, when a printing machine is used to perform a color image printing, it is performed that prior to the printing, a color printer and the like is used to create a proof image which is intended to be similar in color to an image to be printed by the printing machine. When the printer creates the proof image, detected are a color reproduction characteristic (a printing profile) describing a relationship between image data and a color of the actual printed matter, associated with a printing machine of interest, and a color reproduction characteristic (a printer profile) describing a relationship between image data and a color of an image to be actually printed, associated with a printer. Image data for printing is converted into image data for printers in accordance with the printing profile and the printer profile, so that a proof image is created in accordance with the image data for printers thus converted. Thus, it is possible to create a proof image that is coincident with the actual printed matter in color.

In order to obtain a proof image that is coincident with the actual printed matter in color in the manner as mentioned above, there is a need to determine with great accuracy color reproduction characteristics (profiles) of the input device and the output device. When the color reproduction characteristics (profiles) are determined, for example, in case of the input device, a color chart, in which color patches are arranged, is read by the input device and then converted into image data, and coordinates (CYMK values, or RGB values) of color spaces (a device color space: for example, a CMYK color space consisting of four colors of cyan (C), magenta (M), yellow (Y) and black (K), or an RGB color space consisting of three colors of red (R), green (G) and blue (B))) on the image data are determined. And the same color chart is measure by a spectrocolorimeter to determine coordinates ($L^*a^*b^*$ values or XYZ values) of a colorimetry color space (for example, $L^*a^*b^*$ color spaces or XYZ color spaces), and the coordinates on the device color space are associated with the coordinates on the colorimetry color space. Thus, it is possible to determine the color reproduction characteristics (profile) of the input device.

When the color reproduction characteristics (profile) of the output device is determined, image data, which corresponds to a color chart wherein color patches are arranged, is created, the output device outputs the color chart in accordance with the image data thus created, the color chart is measured by the spectrocolorimeter, and the coordinates of the color space (the device color space) on the image data are associated with the coordinates of the colorimetry color space. Thus, it is possible to determine the color reproduction characteristics (profile) of the output device.

The color reproduction characteristics of the input device and the output device are carefully determined, and the image data are converted in accordance with those color reproduction characteristics, nevertheless, various errors and main causes of fluctuations will cause a phenomenon in which colors are delicately different between the original image and the reproduced image, or between the printed matter and the proof image.

Under the circumstance as mentioned above, when it is evaluated as to whether a color of an image outputted from a color printer for example is properly reproduced as to a color of an original image which is read by a color scanner in form of image data, or when it is evaluated as to whether a color of an image outputted from a color printer is coincident with a color of an image on a printed matter, according to the earlier technology, a print output is actually carried out, and a weight is put onto only a point that the printed output image is evaluated. More in detail, according to the earlier technology, on the profile, for example, outlines of the profiles of both the color scanner and the color printer, or outlines of the profiles of both the printing machine and the color printer, are expressed on a two-dimensional plane, so that there is simply performed such an extent of evaluation that what color area is reproduced or not reproduced by the color printer. It is a present state that there is found no suitable one as a tool for scrutinizing on a profile and evaluating such detailed points that but not the rough evaluation on the severe vicinities of the outlines of the profiles, for example, on the center area in which profiles of both the color scanner and the color printer, or profiles of both the printing machine and the color printer, are sufficiently overlapped, how what color on the original image is coincident with or different from color on the reproduced image outputted by the color printer, or into what color image data having a certain value is converted through the printing machine or the printer, or how the printing machine and the color printer are coincident with or different from one another in color conversion.

SUMMARY OF THE INVENTION

In view of the foregoing, it is an object of the present invention to provide a color reproduction characteristic display apparatus suitable for performing a detailed examination on a profile data and a color reproduction characteristic display program storage medium.

To achieve the above-mentioned object, the present invention provides a color reproduction characteristic display apparatus for displaying color reproduction characteristics wherein an association between coordinates of a first color space defining a color on image data and coordinates of a second color space defining a color on an image are defined in accordance with a device for mediating between the image data and the image, said color reproduction characteristic display apparatus comprising:

a range designation section for designating a desired coordinate range in said first color space in accordance with an operation; and an image display section for displaying a color reproduction image in which there are plotted coordinate points on said second color space associated with coordinates within the coordinate range designated by said range designation section of coordinates of lattice points wherein said first color space is partitioned as a lattice.

The color reproduction characteristic display apparatus according to the present invention as mentioned above displays a color reproduction image in which there are plotted coordinate points on the second color space represented by, for example, L*a*b* or XYZ, associated with coordinates of the lattice points in the device color space (the first color space) represented by, for example, RGB or CMYK. This feature makes it possible to perform detailed examination and evaluation since a desired area of the profile is displayed in detail one-by-one.

In the color reproduction characteristic display apparatus according to the present invention as mentioned above, it is preferable that said image display section optionally displays the color reproduction image on a two-dimensional display basis or a three-dimensional display basis in accordance with an operation.

The reason why this is to do so is that there is a case where it is better that the color reproduction image is displayed on a two-dimensional display basis, or it is better that the color reproduction image is displayed on a three-dimensional display basis, in accordance with a content of the examination and evaluation.

In the color reproduction characteristic display apparatus according to the present invention as mentioned above, it is preferable that the color reproduction characteristic display apparatus further comprises a display plot designation section for designating a desired point of points plotted on the color reproduction image in accordance with an operation, and said image display section displays the color reproduction image and in addition coordinate values on said first color space and coordinate values on said second color space, which correspond to the point on the color reproduction image designated by said display plot designation section.

This feature makes clear on a numerical value as to a relationship between points on the color reproduction image and coordinate values on the color space, and thus it is more convenient for the detailed examination and evaluation.

In the color reproduction characteristic display apparatus according to the present invention as mentioned above, the color reproduction characteristic display apparatus further comprises a display plot designation section for designating a desired point of points plotted on the color reproduction image in accordance with an operation, and said image display section displays the color reproduction image and in addition information as to a distance in said second color space, between two points on the color reproduction image designated by said display plot designation section.

This feature also makes more convenient for the detailed examination and evaluation.

In the color reproduction characteristic display apparatus according to the present invention as mentioned above, it is preferable that said image display section has a mode wherein a plurality of color reproduction images associated with a plurality of output devices is displayed on a superposing basis.

This feature makes it possible to compare on the same screen a positional relationship, for example, between a profile of a color scanner and a profile of a color printer, or between a profile of a printing machine and a profile of a color printer.

To achieve the above-mentioned object, the present invention provides a color reproduction characteristic display program storage medium storing a color reproduction characteristic display program which causes a computer to operate as a color reproduction characteristic display apparatus for displaying color reproduction characteristics wherein an association between coordinates of a first color space defining a color on image data and coordinates of a second color space defining a color on an image are defined in accordance with a device for mediating between the image data and the image, said color reproduction characteristic display program comprising:

a range designation section for designating a desired coordinate range in said first color space in accordance with an operation; and an image display section for displaying a color reproduction image in which there are plotted coordinate points on said second color space associated with coordinates within the coordinate range designated by said range designation section of coordinates of lattice points wherein said first color space is partitioned as a lattice, A color reproduction characteristic display program, which is stored in the color reproduction characteristic display program storage medium of the present invention, includes any types of programs which cause a computer to operate as a color reproduction characteristic display apparatus of the present invention, when it is installed in the computer to be executed.

DETAILED DESCRIPTION OF PREFERRED EMBODIMENTS

Embodiments of the present invention will be described with reference to the accompanying drawings.

Here, by way of example, in order to evaluate what extent a color on a proof image outputted by a color printer is coincident with or different from a color on a printed matter obtained by a printing machine, it will be particularly explained that a profile of the color printer is displayed, and profiles of both the color printer and the printing machine are displayed on an overlapping basis.

Figure 1:
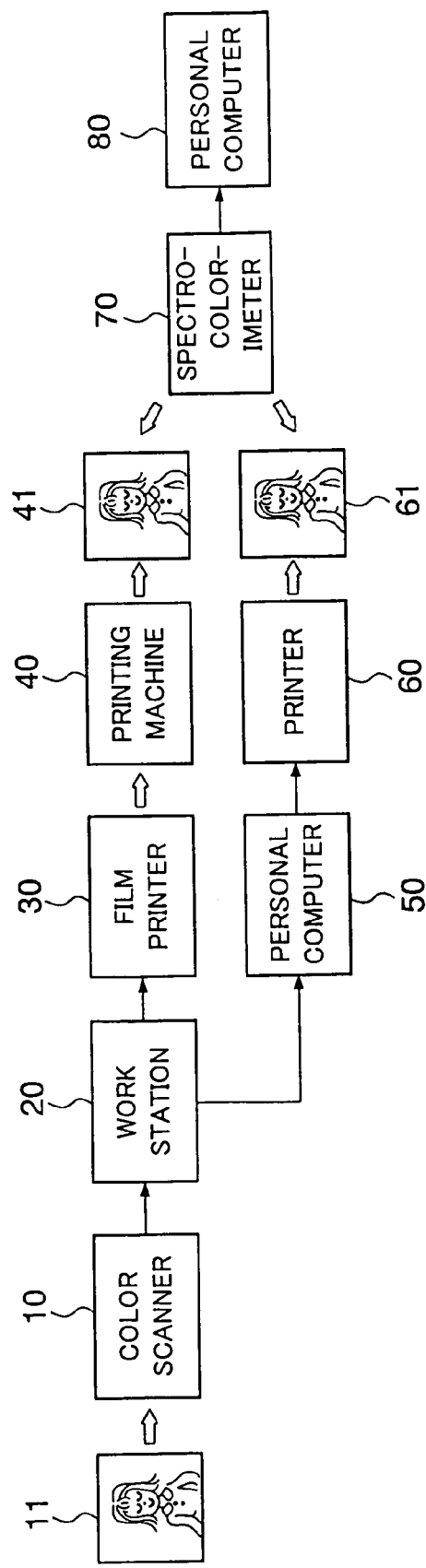
FIG. 1 is a schematic constitution view of a print and proof image creating system to which an embodiment of the present invention is applied.

FIG. 1 is a schematic constitution view of a print and proof image creating system to which an embodiment of the present invention is applied.

A color scanner 10 reads an original image 11 and produces color separation image data of four colors of CMYK representative of the original image 11. The image data of four colors of CMYK is fed to a workstation 20. The workstation 20 performs an electronic page make-up in accordance with image data entered by an operator to create image data representative of an image for printing. The image data for printing is fed, in case of performing printing, to a film printer 30 so that print film original plates for CMYK plates are produced in accordance with the fed image data.

A machine plate is produced from the print film original plate and is mounted on a printing machine 40. Ink is applied to the machine plate mounted on the printing machine 40 and is transferred onto a sheet for print to form a printed image 41 on the sheet.

A series of work, in which the film printer 30 is used to produce the film original plate and further the machine plate, the produced machine plate is mounted on the printing machine 40, and ink is applied to the machine plate to perform a printing on a sheet, is large-scale works and takes a lot of cost. For this reason, before the actual printing works, a printer 60 is used to produce a proof image 61 in accordance with a manner as set forth below, so that a finish of the printed image 41 is confirmed beforehand.

When the proof image is produced, image data, which is created by the electronic page make-up on the workstation 20, is fed to a personal computer 50. Here, the image data fed to the personal computer 50 is description language data described in a so-called PDL (Page Description Language). The personal computer 50 converts the image data of the description language into image data of four colors of CMYK developed to a bit map by a so-called RIP (Raster Image Processor). The image data of four colors of CMYK is substantially the same as the image data for printing fed to the film printer 30.

The image data for printing of four colors of CMYK is converted into image data of four colors of CMYK suitable for a printer 60 through referring to a color conversion definition having a format of LUT (Look Up Table) inside the personal computer 50. The printer 60 receives the image data for the printer of four colors of CMYK and produces the proof image 61 in accordance with the image data for the printer of four colors of CMYK.

A degree of coincidence of colors between the image 41 obtained through printing by the printing machine 40 and the proof image obtained by the printer 60 is determined by the color conversion definition inside the personal computer 50. The color conversion definition is created for each printing condition of printers.

While FIG. 1 shows only one printing machine, it is acceptable that there is provided a plurality of printing machines, or alternatively it is acceptable that while only one printing machine is provided, a plurality of printing conditions, which are mutually different from one another, are prepared, so that the color conversion definition is created in accordance with the plurality of printing conditions including a difference of printing machines. In other words, the color conversion definition is created in accordance with a combination of the respective printing condition and a type of printer (when a single printer is provided and a plurality of printing conditions are provided, the respective printing condition is concerned). A spectrocolorimeter 70 and a personal computer 80, which are shown in FIG. 1, are related to a creation of the color conversion definition.

In this manner, the proof image is produced and confirmed, so that the finish of printing is confirmed beforehand.

An aspect as an embodiment of the present invention in the proof image producing system shown in FIG. 1 resides in processing contents to be executed inside the personal computer 80. Hereinafter, there will be described the personal computer 80.

Figure 2:
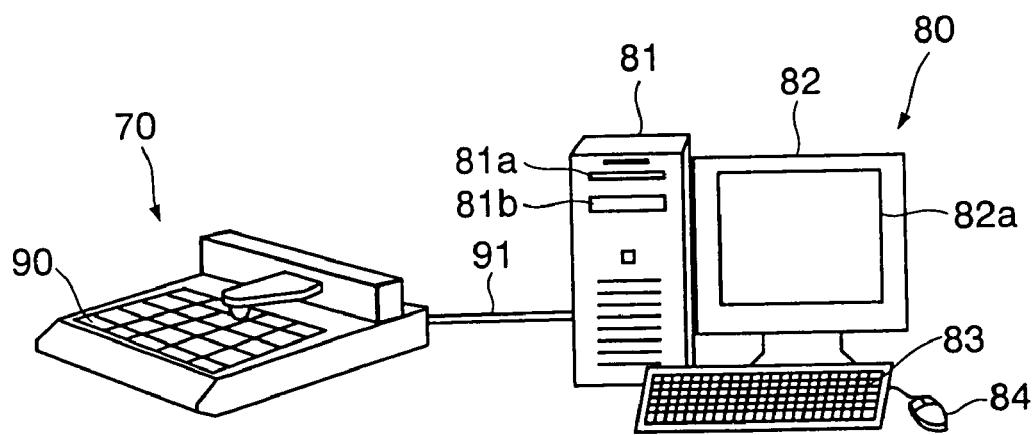
FIG. 2 is a perspective view of a spectrocolorimeter and a personal computer, which are shown in FIG. 1 with blocks.
Figure 3:
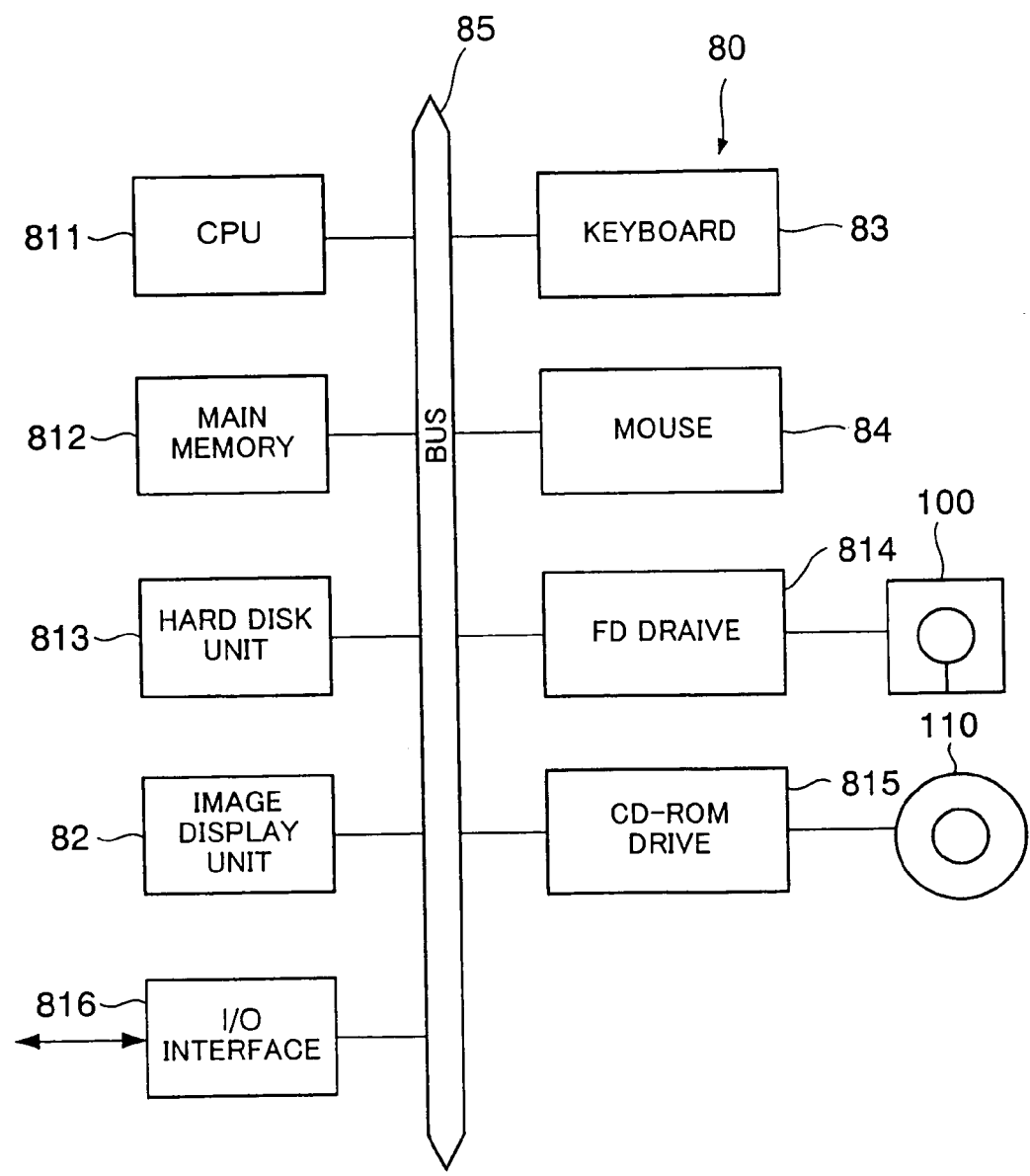
FIG. 3 is a hardware structural view of the personal computer.

FIG. 2 is a perspective view of a spectrocolorimeter 70 and a personal computer 80, which are shown in FIG. 1 with blocks. FIG. 3 is a hardware structural view of the personal computer 80.

A color chart 90, in which a plurality of color patches is arranged, is put on the spectrocolorimeter 70 to measure calorimetric values (here L*a*b*) for each of the plurality of color patches constituting the color chart 90. Colorimetric data representative of the calorimetric values for each of the color patches obtained through measurement by the spectrocolorimeter 70 is fed via a cable 91 to the personal computer 80.

The color chart 90 is produced through printing by the printing machine 40 shown in FIG. 1 or through printing out by the printer 60. The personal computer 80 knows color data (coordinates on the device color space; values of CMYK or RGB) associated with the color patches constituting the color chart 90, and produces a printing profile and a printer profile in accordance with color data for the color patches of the color chart 90 and the colorimetric data obtained by the spectrocolorimeter 70. In this respect, the detail description will be described later. Next, there will be described the hardware structure of the personal computer 80.

The personal computer 80 comprises, on an external appearance, a main frame unit 81, an image display unit 82 for displaying an image on a display screen 82a in accordance with an instruction from the main frame unit 81, a keyboard 83 for inputting various sorts of information to the main frame unit 81 in accordance with a key operation, and a mouse 84 for inputting an instruction according to, for example, an icon and the like, through designation of an optional position on the display screen 82a, the icon and the like being displayed on the position on the display screen 82a. The main frame unit 81 has a floppy disk mounting slot 81a for mounting a floppy disk, and a CD-ROM mounting slot 81b for mounting a CD-ROM.

The main frame unit 81 comprises, as shown in FIG. 3, a CPU 811 for executing a various types of program, a main memory 812 in which a program stored in a hard disk unit 813 is read out and developed for execution by the CPU 811, the hard disk unit 813 for saving various types of programs and data, an FD drive 814 for accessing a floppy disk 100 mounted thereon, a CD-ROM drive 815 for accessing a CD-ROM 110 mounted thereon, an I/O interface 816 connected to the spectrocolorimeter 70 (cf. FIG. 1 and FIG. 2), to receive colorimetry data from the spectrocolorimeter 70, and a printer interface 817 to transmit image data to the printer 60. These various types of elements are connected via a bus 85 to the image display unit 82, the keyboard 83 and the mouse 84.

The CD-ROM 110 stores therein a color reproduction characteristic display program for causing the personal computer 80 to operate as a color reproduction characteristic display apparatus. The CD-ROM 110 is mounted on the CD-ROM drive 815 so that the color reproduction characteristic display program, which is stored in the CD-ROM 110, is up-loaded on the personal computer 80 and is stored in the hard disk unit 813.

Incidentally, functions of the creation of the profile and the color conversion definition, which will be described hereinafter, are not the subjects of the present invention, and it is assumed that programs and the like necessary for implementing the functions are already installed in the personal computer 80.

When the embodiment of a color reproduction characteristic display program of the present invention is stored in the CD-ROM 110, the CD-ROM 110 corresponds to the embodiment of a color reproduction characteristic display program storage medium of the present invention. When the color reproduction characteristic display program of the present invention is up-loaded and stored in the hard disk unit 813, the hard disk unit 813 storing the color reproduction characteristic display program also corresponds to the embodiment of a color reproduction characteristic display program storage medium of the present invention. When the color reproduction characteristic display program of the present invention is down-loaded onto the floppy disk 100, the floppy disk 100 storing the color reproduction characteristic display program also corresponds to the embodiment of a color reproduction characteristic display program storage medium of the present invention.

Next, there will be described a method of creating a color conversion definition constructed in the personal computer 80.

Here, first, a printing profile is produced.

Dot % data for four colors of CMYK from the workstation shown in FIG. 1 are sequentially changed as 0%, 10%, ..., 100%, so that a color chart based on the dot % data thus generated is created in accordance with the above-mentioned printing procedure. While the image 41 shown in FIG. 1 is not an image representative of a color chart, the spectrocolorimeter 70 is used to measure color patches constituting a color chart, it is assumed that the same color chart as the color chart 90 shown in FIG. 2 is printed instead of the image 41. Thus, it is possible to construct a printing profile representative of the association between coordinate values on the color space for four colors of CMYK and coordinate values on the calorimetric color space.

Figure 4:
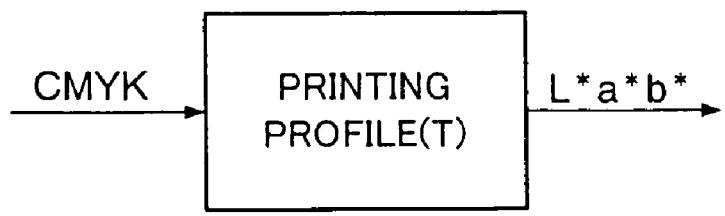
FIG. 4 is a conceptual view of a print profile.

FIG. 4 is a conceptual view of a printing profile.

The printing profile receives image data defined by CMYK (an example of the first color space referred to in the present invention), and converts the image data of CMYK into image data defined by L*a*b* (an example of the second color space referred to in the present invention).

Next, the printer profile is created.

A method of creating the printer profile is the same as the method of creating the printing profile excepting the point that an output device for outputting a color chart is a printer but not a printing machine. That is, the personal computer 50 show in FIG. 1 sequentially changes dot % data for four colors of CMYK as 0%, 10%, ..., 100% for each color, and transmits the dot % data thus generated to the printer 60. The printer 60 outputs the color chart in accordance with the dot % data. While the image 61 shown in FIG. 1 is not an image representative of a color chart, the spectrocolorimeter 70 is used to measure color patches constituting a color chart, it is assumed that the same type of color chart as the color chart created by printing of the printing machine 40 for creating the printing profile is outputted instead of the image 61. Thus, it is possible to construct a printer profile representative of the association between coordinate values on the color space for four colors of CMYK and coordinate values on the colorimetric color space (L*a*b*).

Figure 5:
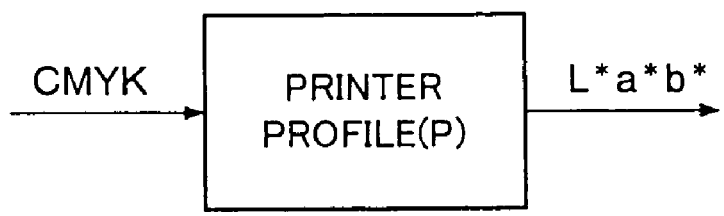
FIG. 5 is a conceptual view of a printer profile.

FIG. 5 is a conceptual view of a printer profile.

The printer profile receives dot % data for four colors of CMYK and converts the dot % data for CMYK into colorimetry data of L*a*b*. Here, P denotes a printer profile (a rectification printer profile) for converting the dot % data for CMYK into the colorimetry data of L*a*b*. $P^{-1}$ denotes a printer profile (an inversion printer profile) for converting the colorimetry data of L*a*b* into the dot % data for CMYK.

While it has been explained that the printer 60 outputs an image in accordance with the dot % data for four colors of CMYK, it is acceptable that a printer, which outputs an image in accordance with data for RGB for example, is used to create a printer profile suitable for the printer in such a manner that the personal computer 50 generates data defined by the RGB space to output a color chart.

However, here, there is explained a case where the printer 60, which outputs an image in accordance with the dot % data for four colors of CMYK, is used.

Figure 6:
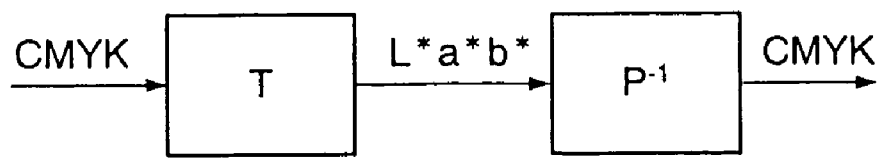
FIG. 6 is a view of a combination profile in which a print profile and a printer profile are combined.

FIG. 6 is a view of a combination profile in which a printing profile and a printer profile are combined.

A printing profile T is used to convert the dot % data for CMYK for printing into calorimetric data of L*a*b*. Next, the inversion printer profile $P^{-1}$ is used to convert the colorimetry data of L*a*b* into the dot % data for CMYK for a printer. Thus, it is possible that the printer 60 outputs a proof image, which is the same as printing in color, in accordance with the dot % data for CMYK for printing thus generated. The combination profile, which comprises the printing profile T and the inversion printer profile $P^{-1}$, is a color conversion definition for converting a CMYK color space for printing into a CMYK color space for a printer.

The color conversion definition, as mentioned above, is created by the personal computer 80 constituting the print and proof image creating system shown in FIG. 1, and then is installed in the personal computer 50 constituting the print and proof image creating system shown in FIG. 1. Image data described in PDL, which is fed from the workstation 20, is converted into image data for CMYK, and then the image data for CMYK is converted into image data for CMYK for a printer using the color conversion definition, so that the printer 60 is used to output an image in accordance with the image data for CMYK for a printer, and thereby creating a proof image for an image of printing.

It is not always necessary that the personal computer 80 shown in FIG. 1 creates up to the combination file. It is acceptable that the personal computer 80 creates the printing profile or the printer profile, and the printing profile or the printer profile thus created is fed to the personal computer 50 to create the combination profile.

Next, there will be explained a display mode of the profile thus created by the personal computer 80.

Figure 7:
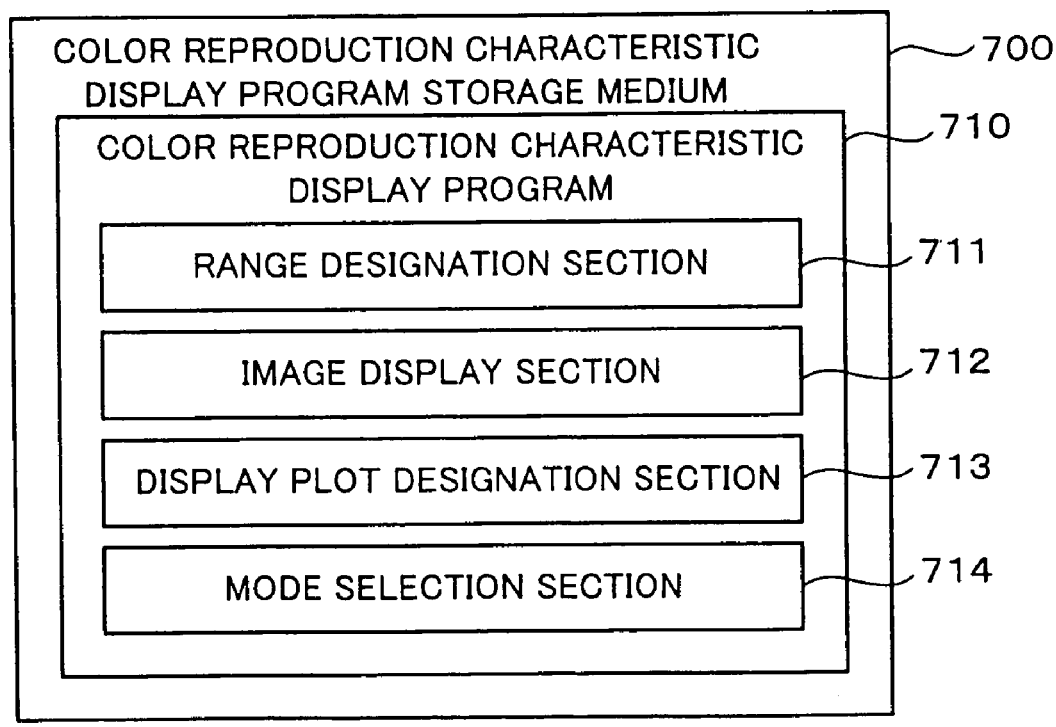
FIG. 7 is a view showing an embodiment of a color reproduction characteristic display program storage medium of the present invention.

FIG. 7 is a view showing an embodiment of a color reproduction characteristic display program storage medium of the present invention. A color reproduction characteristic display program storage medium 700 typically shows the CDROM 110, the floppy disk 100, the hard disk device 813 and so on, which store therein the color reproduction characteristic display program 710, in the structure shown in FIG. 3.

The color reproduction characteristic display program 710, which is stored in the color reproduction characteristic display program storage medium 700, comprises a range designation section 711, an image display section 712, a display plot designation section 713 and a mode selection section 714. Operations of those program elements will be described later.

Figure 8:
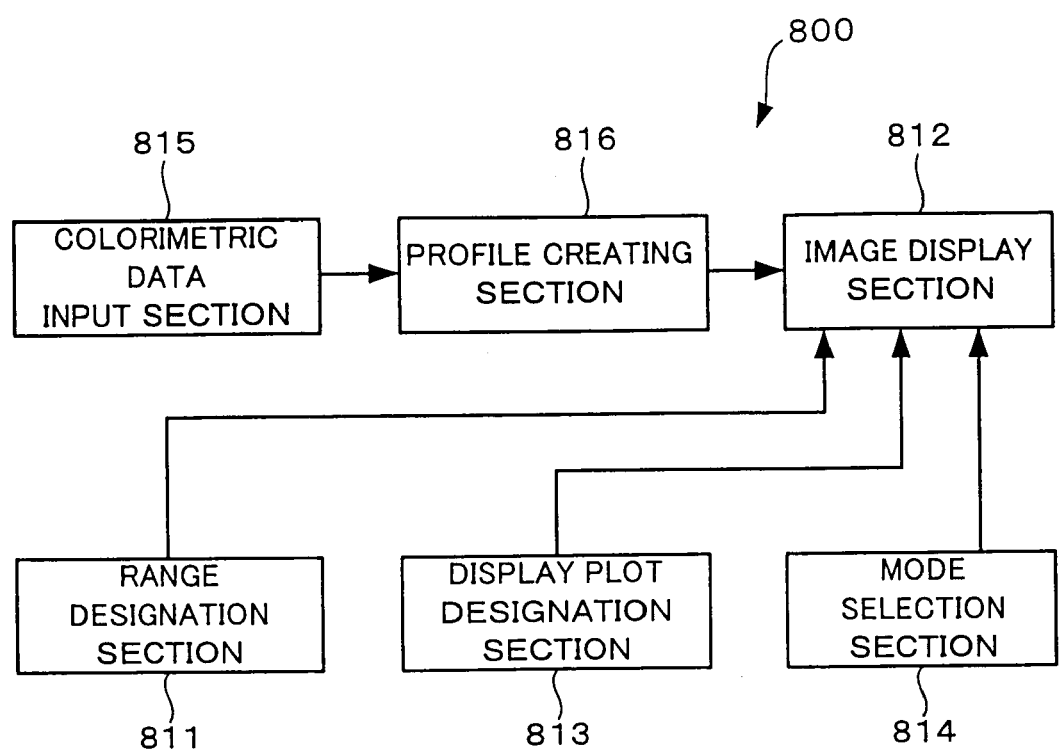
FIG. 8 is functional block diagram of a profile creation display apparatus including an embodiment of a color reproduction characteristic display apparatus of the present invention, which is constructed in the personal computer shown in FIGS. 1 and 2.

FIG. 8 is functional block diagram of a profile creation display apparatus including an embodiment of a color reproduction characteristic display apparatus of the present invention, which is constructed in the personal computer 80 shown in FIGS. 1 and 2.

A profile creation display apparatus 800 comprises a calorimetric data input section 815, a profile creating section 816, an image display section 812, a range designation section 811, a display plot designation section 813 and a mode selection section 814. Of the structure elements of the profile creation display apparatus 800 in FIG. 8, the range designation section 811, the image display section 812, the display plot designation section 813 and the mode selection section 814 are constructed by a compound of the personal computer 80 shown in FIGS. 1 and 2 and the color reproduction characteristic display program 710 shown in FIG. 710. The range designation section 811, the image display section 812, the display plot designation section 813 and the mode selection section 814 of the profile creation display apparatus 800 shown in FIG. 8 correspond to the range designation section 711, the image display section 712, the display plot designation section 713 and the mode selection section 714 of the color reproduction characteristic display program 710 shown in FIG. 7, respectively. It is noted that while the same names are applied, the structural elements in FIG. 8 denote a compound of the hardware and the software, and the structural elements of the color reproduction characteristic display program 710 shown in FIG. 7 denote only a portion of the application software.

Hereinafter, there will be explained the structural elements of the profile creation display apparatus 800 shown in FIG. 8. It is noted that this explanation implies the explanation for the structural elements of the color reproduction characteristic display program 710 shown in FIG. 7 too.

A colorimetric data input section 815 of the profile creation display apparatus 800 shown in FIG. 8 has a function of receiving the calorimetric data obtained by the spectrocolorimeter 70 shown in FIGS. 1 and 2 and transferring the same to the profile creating section 816. The colorimetric data input section 815 mainly corresponds to the I/O interface 816 of the personal computer 80 shown in FIG. 3 on a hardware basis.

The profile creating section 816 shown in FIG. 8 has a function of creating the printing profile and the printer profile which are explained referring to FIGS. 4 and 5, and is implemented by installing a profile creating program (not illustrated) in the personal computer 80. The profile creating section 816 shown in FIG. 8 corresponds to the CPU 811 shown in FIG. 3 on a hardware basis.

The range designation section 811 designates a desired coordinate range on a CMYK color space in accordance with an operation, and mainly corresponds to the keyboard 83 and the mouse 84 of the personal computer 80 shown in FIGS. 2 and 3 on a hardware basis.

The image display section 812 basically displays a color reproduction image in which there are plotted coordinate points on the L*a*b* color spaces associated with coordinates within the coordinate range designated by the range designation section 811 of the coordinates of the lattice points wherein a CMYK color space is partitioned as a lattice. The image display section 812 mainly corresponds to the image display unit 82 of the personal computer 80 shown in FIGS. 2 and 3 on a hardware basis. Concrete display modes of the image display section 812 will be described later.

The display plot designation section 813 designates a desired point of the points plotted on the color reproduction image displayed in the image display section 812 in accordance with an operation. The display plot designation section 813 mainly corresponds to the mouse 84 on a hardware basis. When the display plot designation section 813 designates a desired point on the color reproduction image, the image display section 812 displays together with the color reproduction image coordinate values of the CMYK color space corresponding to the points on the color reproduction image designated by the display plot designation section 813 and coordinate values on the L*a*b* color spaces.

Further, the display plot designation section 813 can designate desired two points of the points plotted on the color reproduction image in accordance with an operation. In this case, the image display section 812 displays together with the color reproduction image information (color difference) as to a distance between two coordinates on the L*a*b* color spaces corresponding to the two points on the color reproduction image designated by the display plot designation section 813.

While the image display section 812 basically displays on an image screen a color reproduction image of an output device (either one of the printing machine 40 and the printer 60 shown in FIG. 1), there is also a mode in which color reproduction images of a plurality of output devices (both the printing machine 40 and the printer 60 shown in FIG. 1) are displayed on a superposition basis. The mode selection section 814 optionally selects in accordance with an operation one of the mode in which a color reproduction image of a certain output device is displayed and the mode in which color reproduction images of a plurality of output devices are displayed on a superposition basis.

Figure 9:
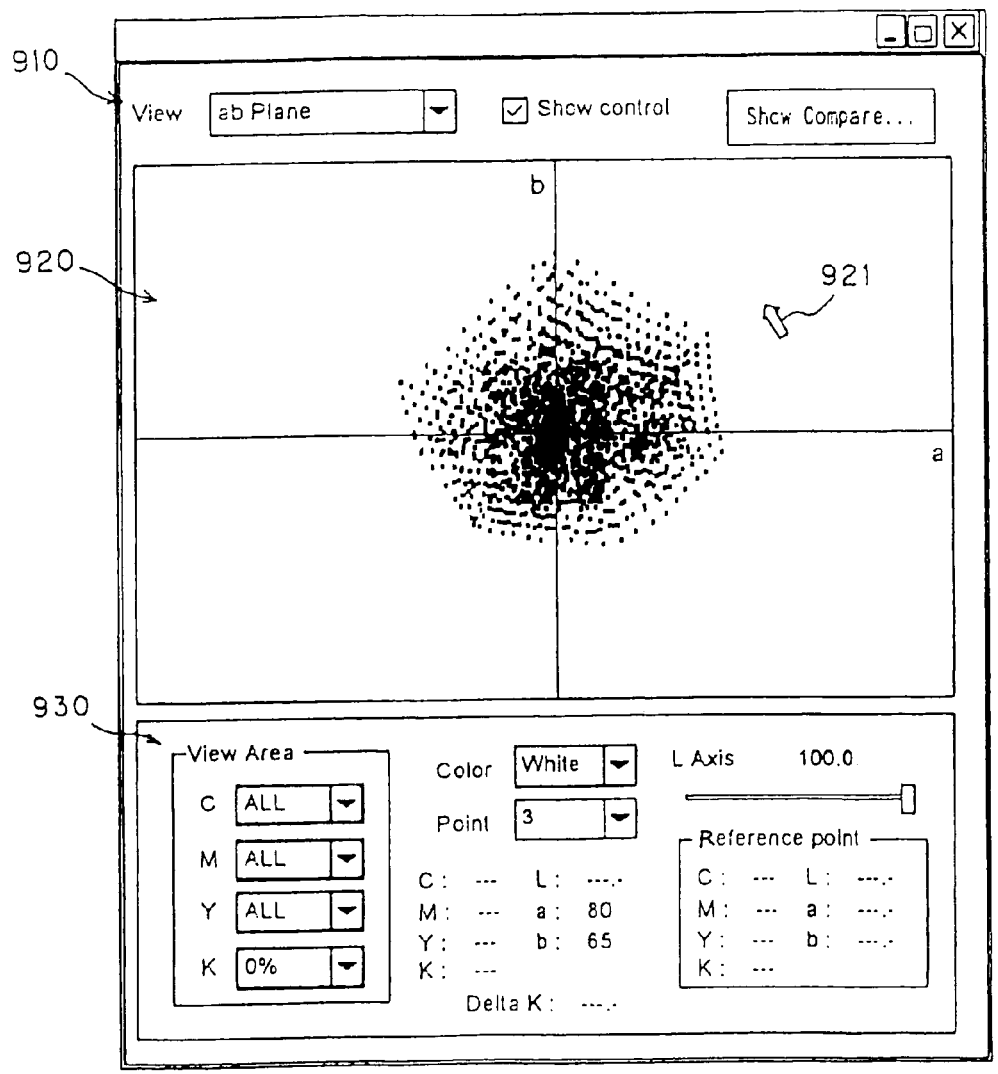
FIG. 9 is a view showing a first example of an image displayed on a display screen of an image display unit.

FIG. 9 is a view showing a first example of an image displayed on the display screen 82a (cf. FIG. 2) of the image display unit 82 by the image display section 812.

The image shown in FIG. 9 comprises an upper panel display section 910, a color reproduction image display section 920 and a lower panel display section 930.

The color reproduction image display section 920 is a portion for displaying a color reproduction image in which plotted are points indicative of coordinate points in the L*a*b* color spaces, associated with the coordinates of lattice points within the range designated by "View Area" of the lower panel display section 930 which will be described later, of lattice points by 10% in dot % (0%, 10%, . . . , 100%) for each of C, M, Y, K of a CMYK color space.

"View" of the upper panel display section 910 can be selected from between "ab Plane" and "Lab Space" (cf. FIG. 10) in accordance with a mouse operation, where "ab Plane" implies that there is displayed on the color reproduction image display section 920 a color reproduction image on a two-dimensional display basis when looking from the upper side (the larger side in value) to the lower side (the smaller side in value) of an L* axis as one's eyes. "Lab Space" implies that there is displayed on the color reproduction image display section 920 a color reproduction image on a three-dimensional display basis.

"Show control" of the upper panel display section 910 selects between displaying the lower panel display section 930 and erasing the lower panel display section 930 from the image screen, in accordance with an operation of the mouse.

Figure 10:
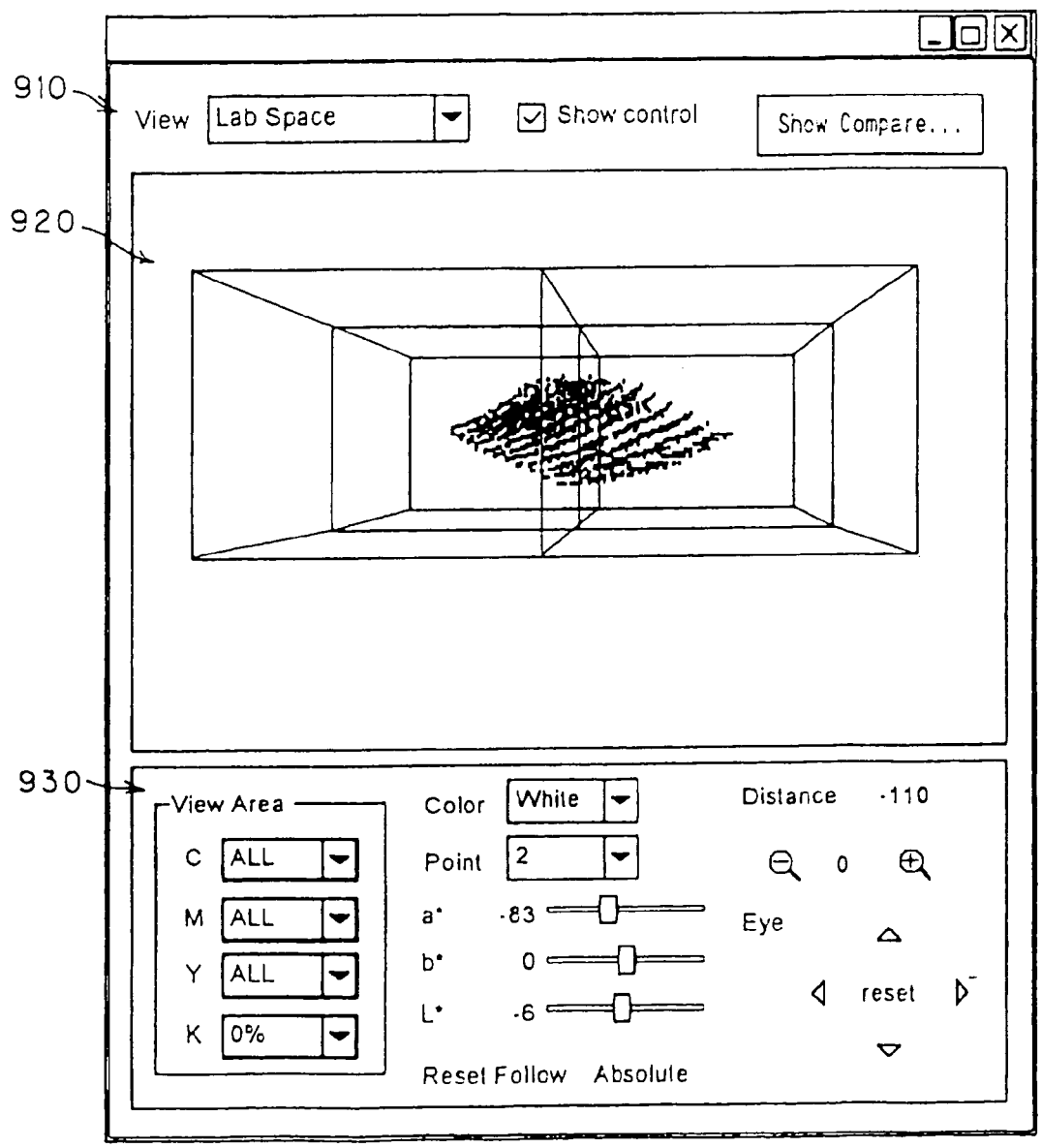
FIG. 10 is a view showing a second example of an image displayed on a display screen of an image display unit.
Figure 11:
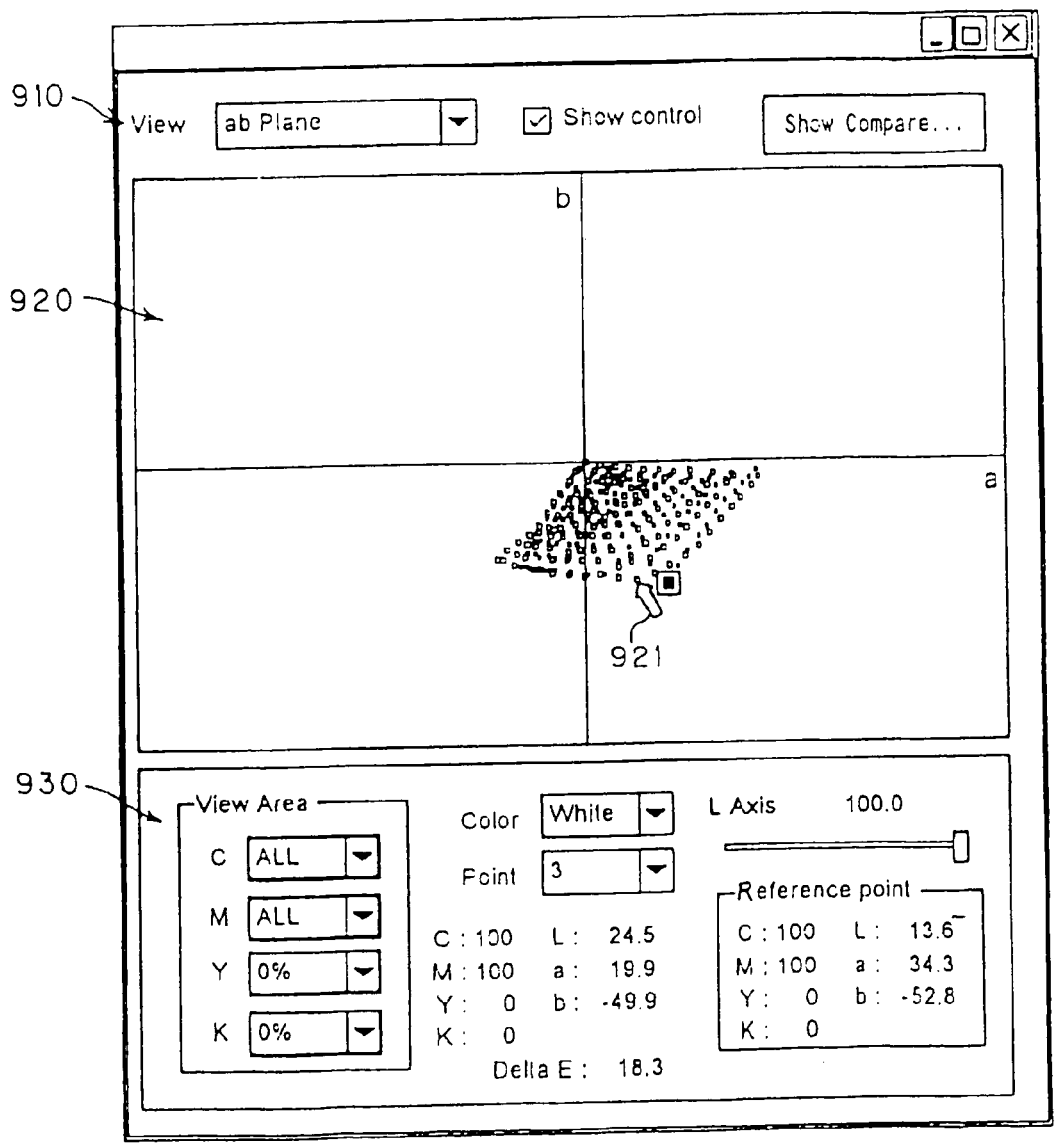
FIG. 11 is a view showing a third example of an image displayed on a display screen of an image display unit.
Figure 12:
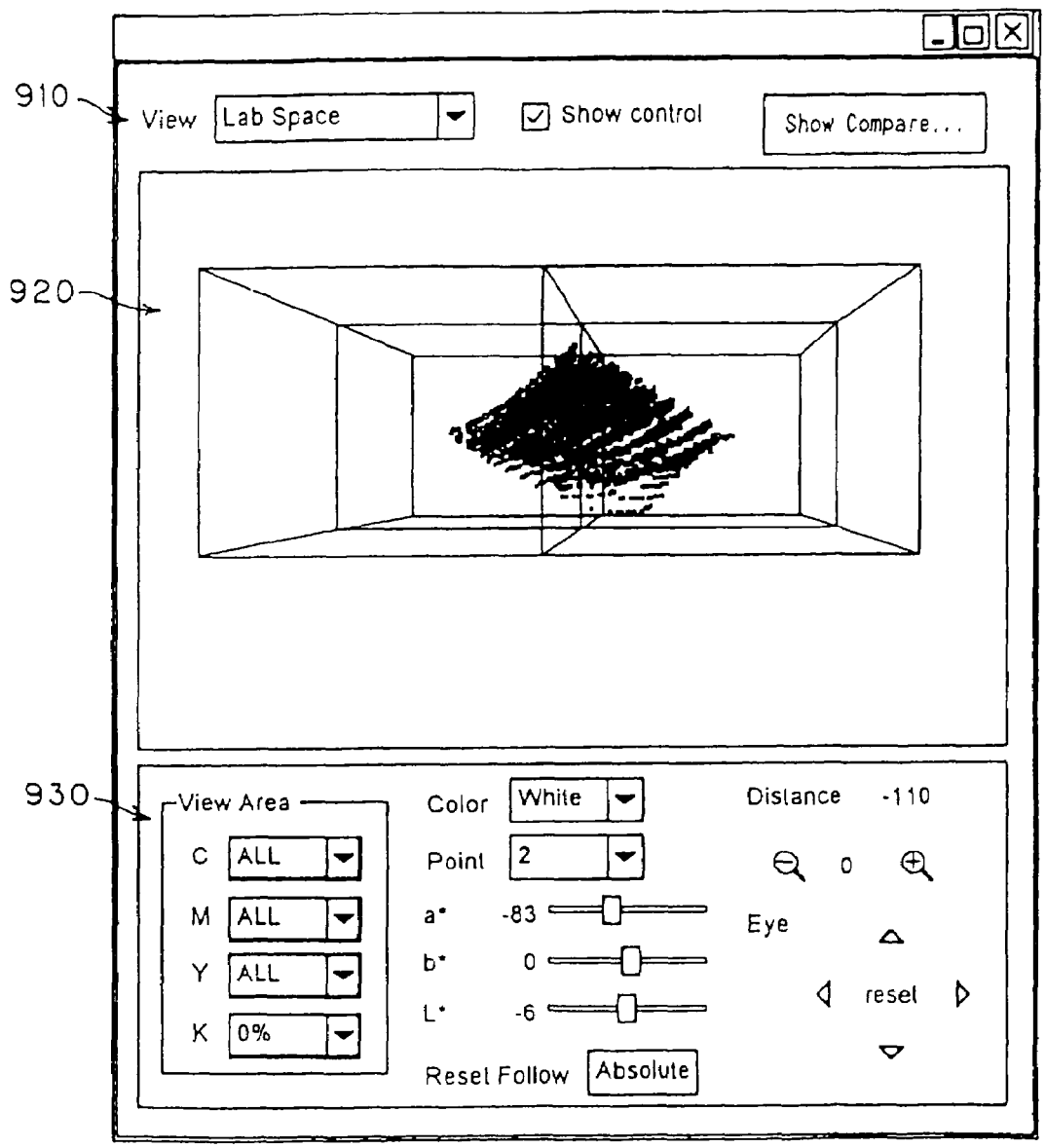
FIG. 12 is a view showing a fourth example of an image displayed on a display screen of an image display unit.

"Show compare" of the upper panel display section 910 selects, whenever the mouse is clicked once, selects between a display in which as shown in FIGS. 9 and 10, only a color reproduction image of one output device is displayed on the color reproduction image display section 920, and a display in which as shown in FIGS. 11 and 12, color reproduction images of two output devices are displayed on the color reproduction image display section 920 on a superposition basis. The "Show compare" is a GUI screen of the mode selection section 814 of the profile creation display apparatus 800 shown in FIG. 8.

In the event that a color reproduction image of one output device is displayed on the color reproduction image display section 920, points constituting the color reproduction image are represented by colors associated with coordinates of the L*a*b* color spaces of the points. On the other hand, in the event that color reproduction images of two output devices are displayed on the color reproduction image display section 920 on a superposition basis, points within one color reproduction image are represented by the same color, and points between two color reproduction images are represented by mutually different colors.

"View Area" of the lower panel display section 930 is a GUI screen of the range designation section 811 of the profile creation display apparatus 800 of FIG. 8, and is able to select from among "0%", "10%", . . . , "100%", and "ALL" on each of C, M, Y and K in accordance with an operation of the mouse. "0%", "10%", . . . , and "100%" imply that the dot % is fixed to "0%", "10%", . . . , "100%", respectively. "ALL" implies that all of 0% to 100% are selected. According to the example shown in FIG. 9, C, M, Y and K are designated to "ALL", "ALL", "ALL" and "0%", respectively. This implies that displayed are points within the L*a*b* color space associated with the lattice points by 10% within the three-dimensional color space defined by the C axis, the M axis and the Y axis where K=0%. Here, since "ab Plane" is selected by "View" of the upper panel display section 910, the color reproduction image display section 920 displays the color reproduction image when looking at those points from the upper in parallel to the L* axis.

"Color" of the lower panel display section 930 is for selecting a color of the background of the color reproduction image display section 920. The color of the background can be selected between the "White" and the "Black". "Point" is for selecting sizes of points constituting the color reproduction image displayed on the color reproduction image display section 920.

"C:", "M:", "Y:", "K:", "L:", "a:" and "b:" below the "Point" are columns in which when a mouse cursor 921 meets anyone of the points constituting the color reproduction image, displayed are coordinates (the respective values of CMYK) of the CMYK color space associated with the points and coordinates (the respective values of L*a*b*) of the L*a*b* color space. FIG. 9 shows the color reproduction image having geometry projected onto a*b* planes. When the mouse cursor 921 is away from any point, as shown in FIG. 9 such as "a: 80" and "b: 65", only a* value and b* value of the position of the present mouse cursor are displayed.

"Reference Point" of the neighbor on the right are also columns in which displayed are coordinates (the respective values of CMYK) of the CMYK color space associated with the points and coordinates (the respective values of L*a*b*) of the L*a*b* color space. When the mouse cursor 921 is brought with any one of the points on the color reproduction image and the mouse click is performed, the point is registered as a reference point, and the respective values of CMYK and L*a*b* of the reference point are displayed on the column of the "Reference Point". Thus, when the mouse cursor 921 moves to another point while the reference point is registered by the mouse click, the respective values of CMYK and L*a*b* of the point now indicated by the mouse cursor 921 are displayed on the column of the neighbor on the left of the "Reference Point", and in addition a color difference between those two points (the reference point and the point now indicated by the mouse cursor) is displayed on the column of "Delta E)".

"L Aaxis", which is displayed right above the column of the "Reference Point", constitutes a GUI of the range designation section 811 of the profile creation display apparatus 800 in FIG. 8, together with the "View Area" at the left side of the lower panel display section 930, when the "View" of the upper panel display section 910 selects the "ab Plane". In the explanation of the "View Area", it is described that the color reproduction image display section 920 displays the color reproduction image consisting of an assembly of points of the range designated by the "View Area" in the CMYK color space. This is concerned with a situation that the slide bar of the "L Axis" is positioned at 100.0. When the slide bar of the "L Axis" is moved from 100.0, the color reproduction image will be changed as follows.

In FIG. 9, the slide bar of the "L Axis" is set up to 100.0. In this case, there are displayed points which are arranged below (an L* value is smaller side) a plane extending in parallel to a*-b* planes when the L*a*b* space is partitioned on the extending plane at the position of an L* axis=100.0 (the maximum value) on the L* axis (when the L* axis is 100.0, the L*a*b* space is displayed in its entirety). On the other hand, when the slide bar of the "L Axis" is moved to 50.0 (the center) for example, there are displayed only points which are arranged below a plane wherein the L* axis is partitioned with the "L Axis" =50.0 in parallel to a*-b* planes, in the L*a*b* color space.

FIG. 10 is a view showing a second example of an image displayed on the display screen 82a (cf. FIG. 2) of the image display unit 82 by the image display section 812.

This image comprises, similar to the case of FIG. 9, an upper panel display section 910, a color reproduction image display section 920 and a lower panel display section 930.

A color reproduction image displayed on the color reproduction image display section 920 shown in FIG. 10 is a three-dimensional display of image, which is displayed when "Lab Space" is selected in "View" of the upper panel display section 910, wherein in order to direct a three-dimensional image, there is plotted a three-dimensional room around the color reproduction image.

"Show control" and "Show Compare" of the upper panel display section 910 are the same as those in FIG. 9, and thus the redundant explanation will be omitted. Here, in a similar fashion to that of FIG. 9, the "Show Compare" is not subjected to an operation of the mouse, and the color reproduction image display section 920 displays the color reproduction image of an output device.

"View Area", "Color" and "Point" of the lower panel display section 930 have the same functions as those in FIG. 9, respectively, and thus the redundant explanation will be omitted.

Slide bars of "a*", "b*" and "L*" below "Point" are for designating a posture of a three-dimensional shape of the color reproduction image displayed on the color reproduction image display section 920.

In the initial state that all "a*", "b*" and "L*" are zero (that is, the state that all those three slide bars are set up in the middle position), there is displayed the color reproduction image involved in a viewpoint similar to that of FIG. 9, that is, a state looking at the L* axis in the L*a*b* color space from upper (larger values) to under (smaller values). When the slide bars of "a*", "b*" and "L*" are moved, rotary angles around a* axis, "b*" axis and "L" axis are adjusted, so that the color reproduction image, which rotates around those axes by the adjusted rotary angles, is displayed.

When the slide bars of "a*", "b*" and "L*" are moved and then "Reset" is clicked, all those slide bars are returned to the initial position.

Here, for example, when the slide bars of "a*", "b*" and "L*" are moved in a state that the color reproduction image display section 920 displays the color reproduction image in the initial state, a turn of rotation around the a* axis, the "b*" axis and the "L" axis makes a posture of the final color reproduction image after the rotation different. In other words, the posture of the final color reproduction image after the rotation is varied in accordance with a turn of rotation around the a* axis, the "b*" axis and the "L" axis, specifically, for example, in such a way that the rotation around the a* axis, the "b*" axis and the "L" axis is performed in the named order, or alternatively in the different order. Thus, there are prepared two types of rotation of "Follow" and "Absolute". According to the example shown in FIG. 10, the "Absolute" is designated. When the "Absolute" is designated, regardless of the operating order of the slide bars of "a*", "b*" and "L*", the color reproduction image display section 920 displays the color reproduction image of the posture wherein always starting from the initial state, the rotation around the a* axis, the "b*" axis and the "L" axis is performed in the named order.

On the other hand, in the event that the "Follow" is designated, when the slide bars of "a*", "b*" and "L*" are operated, there is displayed a color reproduction image of a posture which is rotated by a rotary angle according to the operating amount around the axis in accordance with the order of the operation. In the "Follow", when the color reproduction image of a certain posture is displayed, an operation of for example the slide bar of "a*-" causes the color reproduction image now displayed to rotate around the a* axis by the rotary amount according to the operating amount.

With respect to "Distance" at the right side of the lower panel display section 930, when "+" is clicked to move to the plus side, the color reproduction image display section 920 displays a color reproduction image (an enlarged color reproduction image) in a state that a viewpoint approaches the color reproduction image in accordance with the operating amount. When "−" is clicked to move to the minus side, the color reproduction image display section 920 displays a color reproduction image (a reduced color reproduction image) in a state that a viewpoint goes away from the color reproduction image in accordance with the operating amount. When "0" is clicked, it returns to the standard viewpoint.

With respect to four triangle marks located at the upper and lower sides and right and left and "reset" of the center, which constitute "Eye", the color reproduction image displayed on the color reproduction image display section 920 varies in such a manner that one's viewpoint moves vertically and horizontally or returns to the original position in accordance with the mouse operation.

FIG. 11 is a view showing a third example of an image displayed on the display screen 82a (cf. FIG. 2) of the image display unit 82 by the image display section 812 of the profile creation display apparatus 800.

This image comprises, similar to the case of FIGS. 9 and 10, an upper panel display section 910, a color reproduction image display section 920 and a lower panel display section 930.

A color reproduction image displayed on the color reproduction image display section 920 shown in FIG. 11 is a two-dimensional display of image, which is projected onto a*-b* planes, since "ab Plane" is selected in "View" of the upper panel display section 910. However, in FIG. 11, different from the case of FIG. 9, "Show Compare" of the upper panel display section 910 is clicked, so that the color reproduction image display section 920 displays two color reproduction images on an overlapping basis. Further, in FIG. 11, "C:", "M:", "Y:" and "K:" of "View Area" of the lower panel display section 930 are designated to "ALL", "ALL", "0%" and "0%", respectively. Thus, the color reproduction image display section 920 displays points in the L*a*b* color space associated with lattice points arranged on C-M planes where Y=0%, and K=0%.

Further, in FIG. 11, the mouse cursor 921 is brought with a certain point on the color reproduction image and is clicked, so that the point is registered as a reference point and values of CMYK and L*a*b* of the reference point are displayed on the "Reference Point". Further, a rectangular mark is displayed on the reference point, and the reference point is displayed with enlargement in the rectangular mark. Thereafter, the mouse cursor 921 is further moved to indicate another point, values of CMYK and L*a*b* of the point now indicated by the mouse cursor 921 are displayed at the neighbor on the left of the "Reference Point". A color difference between those two points is displayed on "Delta E".

FIG. 12 is a view showing a fourth example of an image displayed on the display screen 82a (cf. FIG. 2) of the image display unit 82 by the image display section 812 of the profile creation display apparatus 800.

This image comprises, similar to the case of FIGS. 9 to 11, an upper panel display section 910, a color reproduction image display section 920 and a lower panel display section 930.

A color reproduction image displayed on the color reproduction image display section 920 shown in FIG. 12 is a three-dimensional display of image, since "Lab Space" is selected in "View" of the upper panel display section 910. Further, according to the example of FIG. 12, when the "Show Compare" is clicked, the color reproduction image display section 920 displays color reproduction images of two output devices on a superposing basis (in this case, since it is a three-dimensional shape, it means on a three-dimensional basis a state that the color reproduction images are gotten in one another).

Other points of FIG. 12 are the same as those in the second example shown in FIG. 10 and thus the redundant explanation will be omitted.

The above embodiments have been explained taking into consideration that the profile of the printer 60 shown in FIG. 1 is displayed, and the profile of the printer 60 is displayed on a superposing basis with the profile of the printing machine 40. It should be noticed, however, that the profile creation display apparatus 800 shown in FIG. 8, which is constructed in the personal computer 80 shown in FIGS. 1 to 3, is able to display not only a printer profile, but also a profile of the printing machine 40 (cf. FIG. 1) individually. Also it is possible to create and display the profile of the color scanner 10. When the profile of the color scanner 10 is displayed, the color scanner 10 is used to read a color chart of the same format as the color chart 90 shown in FIG. 2, instead of the original image 11 shown in FIG. 1, so as to obtain image data for CMYK. The image data thus obtained is read through a portable type of storage medium such as a floppy disk, or alternatively through directly connecting the color scanner 10 with the personal computer 80, so that the image data is taken into the personal computer 80. Further, the color chart read by the color scanner 10 is measured by the spectrocolorimeter 70 to obtain calorimetric data of L*a*b*. The colorimetric data thus obtained is fed to the personal computer 80. The profile creating section 816 of the profile creation display apparatus 800 shown in FIG. 8, which is constructed in the personal computer 80, associates the image data for CMYK with colorimetric data for L*a*b* to create the profile of the color scanner 10, so that the profile thus created is displayed in a similar fashion to that of the above explanation. Further, it is possible to display the profile of the color scanner 10 on a superimposing basis with the profile of the printing machine 40 or the profile of the printer 60. Alternatively, a method of creating the profile per se is not the subject of the present invention, it is acceptable that profiles of an input device and an output device, which are not illustrated in FIG. 1, for example, an electronic still camera and an image display device, are obtained and displayed In this manner, according to the present invention, it is possible to display color reproduction characteristics of any type of devices individually or on a superimposing basis, regardless of a sort of devices for inputting or outputting (including displaying) images.

While the above-mentioned embodiments relate to a display appearance of a profile dealing with a conversion between a CMYK color space and an L*a*b* color space, the present invention is not restricted to those embodiments. The present invention is also applicable to a case where there is displayed a profile defining a relationship between a RGB color space and an L*a*b* color space, or a relationship between a CMYK color space or a RGB color space and an XYZ color space.

As mentioned above, according to the present invention, it is possible to obtain a display suitable for performing a detailed examination on a profile data.

While the present invention has been described with reference to the particular illustrative embodiments, it is not to be restricted by those embodiments but only by the appended claims. It is to be appreciated that those skilled in the art can change or modify the embodiments without departing from the scope and sprit of the present invention.

What is claimed is:

1. A color reproduction characteristic display apparatus for displaying color reproduction characteristics wherein an association between coordinates of a first color space defining a color on image data and coordinates of a second color space defining a color on an image are defined in accordance with a device for mediating between the image data and the image, said color reproduction characteristic display apparatus comprising:

a range designation section for designating a desired coordinate range in said first color space in accordance with an operation;

an image display section for displaying a color reproduction image in which there are plotted coordinate points on said second color space associated with coordinates within the coordinate range designated by said range designation section of coordinates of lattice points wherein said first color space is partitioned as a lattice; and wherein said image display section displays the color reproduction image together with information as to a distance in said second color space, said distance noting a color difference of, and corresponding to, two points on the color reproduction image designated by a display plot designation section.

2. A color reproduction characteristic display apparatus according to claim 1, wherein said image display section optionally displays the color reproduction image on a two-dimensional display basis or a three-dimensional display basis in accordance with an operation.

3. A color reproduction characteristic display apparatus according to claim 1, further wherein said display plot designation section designates a desired point of points plotted on the color reproduction image in accordance with an operation, wherein said image display section displays the color reproduction image and in addition coordinate values on said first color space and coordinate values on said second color space, which correspond to the point on the color reproduction image designated by said display plot designation section.

4. A color reproduction characteristic display apparatus according to claim 1, further wherein said display plot designation section designates a desired point of points plotted on the color reproduction image in accordance with an operation.

5. A color reproduction characteristic display apparatus according to claim 1, wherein said image display section has a mode wherein a plurality of color reproduction images associated with a plurality of output devices is displayed on a superposing basis.

6. The apparatus of claim 1, wherein the device for mediating:

relates a color conversion for the image data to a device-independent color space as a first transform; relates a color conversion for the image to the device-independent color space as a second transform; and inter-relates the first transform and an inverse of the second transform.

7. The color reproduction characteristic display apparatus of claim 1, further wherein said image display section plots a three-dimensional room around said color reproduction image.

8. The color reproduction characteristic display apparatus of claim 1, further wherein said image display section includes at least two different types of rotation for posturing a final color reproduction image.

9. The color reproduction characteristic display apparatus of claim 8, wherein said at least two different types of rotation for posturing include: i) follow rotation and ii) absolute rotation.

10. The color reproduction characteristic display apparatus of claim 9, wherein said follow rotation comprises displaying a color reproduction image of a posture which is rotated by a rotary angle according to an operating amount around an axis in accordance with an operation, and said absolute rotation comprises displaying a color reproduction image of a posture beginning at an initial state and the rotation around various axes are performed in a named order.

11. The color reproduction characteristic display apparatus of claim 1, further wherein said distance is displayed as a graphical difference of a distance between lattice points.

12. A color reproduction characteristic display program storage medium storing a color reproduction characteristic display program which causes a computer to operate as a color reproduction characteristic display apparatus for displaying color reproduction characteristics wherein an association between coordinates of a first color space defining a color on image data and coordinates of a second color space defining a color on an image are defined in accordance with a device for mediating between the image data and the image, said color reproduction characteristic display program comprising:

a range designation section for designating a desired coordinate range in said first color space in accordance with an operation;

an image display section for displaying a color reproduction image in which there are plotted coordinate points on said second color space associated with coordinates within the coordinate range designated by said range designation section of coordinates of lattice points wherein said first color space is partitioned as a lattice; and wherein said image display section displays the color reproduction image together with information as to a distance in said second color space, said distance noting a color difference of, and corresponding to, two points on the color reproduction image designated by a display plot designation section.

13. The color reproduction characteristic display program storage medium storing a color reproduction characteristic display program which causes a computer to operate as a color reproduction characteristic display apparatus for displaying color reproduction characteristics of claim 12, further wherein said image display section plots a three-dimensional room around said color reproduction image.

14. The color reproduction characteristic display program storage medium storing a color reproduction characteristic display program which causes a computer to operate as a color reproduction characteristic display apparatus for displaying color reproduction characteristics of claim 6, further wherein said image display section includes at least two different types of rotation for posturing a final color reproduction image.

15. The color reproduction characteristic display program storage medium storing a color reproduction characteristic display program which causes a computer to operate as a color reproduction characteristic display apparatus for displaying color reproduction characteristics of claim 14, wherein said at least two different types of rotation for posturing include: i) follow rotation and ii) absolute rotation.

16. The color reproduction characteristic display program storage medium storing a color reproduction characteristic display program which causes a computer to operate as a color reproduction characteristic display apparatus for displaying color reproduction characteristics of claim 15, wherein said follow rotation comprises displaying a color reproduction image of a posture which is rotated by a rotary angle according to an operating amount around an axis in accordance with an operation, and said absolute rotation comprises displaying a color reproduction image of a posture beginning at an initial state and the rotation around various axes are performed in a named order.

17. The color reproduction characteristic display program storage medium storing a color reproduction characteristic display program which causes a computer to operate as a color reproduction characteristic display apparatus for displaying color reproduction characteristics of claim 12, further wherein said distance is displayed as a graphical difference of a distance between lattice points.

18. A color reproduction characteristic display apparatus for displaying color reproduction characteristics wherein an association between coordinates of a first color space, said first color space being device-dependent and defining a color on image data, and coordinates of a second color space, said second color space being device-independent and defining a color on an image, said first and second color spaces and associated coordinates being defined in accordance with a device for mediating between the image data and the image, said color reproduction characteristic display apparatus comprising:

a range designation section for designating a desired coordinate range in said first color space in accordance with an operation; and an image display section for displaying a color reproduction image in which there are plotted coordinate points on said second color space associated with coordinates within the coordinate range designated by said range designation section of coordinates of lattice points wherein said first color space is partitioned as a lattice.

19. The color reproduction characteristic display apparatus of claim 18, further wherein said image display section plots a three-dimensional room around said color reproduction image.

20. The color reproduction characteristic display apparatus of claim 18, further wherein said image display section includes at least two different types of rotation for posturing a final color reproduction image.

21. The color reproduction characteristic display apparatus of claim 20, wherein said at least two different types of rotation for posturing include: i) follow rotation and ii) absolute rotation.

22. The color reproduction characteristic display apparatus of claim 21, wherein said follow rotation comprises displaying a color reproduction image of a posture which is rotated by a rotary angle according to an operating amount around an axis in accordance with an operation, and said absolute rotation comprises displaying a color reproduction image of a posture beginning at an initial state and the rotation around various axes are performed in a named order.

23. The color reproduction characteristic display apparatus of claim 18, further wherein a distance is displayed as a graphical difference of a distance between lattice points.

* * * * *